(12) United States Patent
Daniele et al.

(10) Patent No.: US 7,738,528 B2
(45) Date of Patent: Jun. 15, 2010

(54) GENERATOR OF REPETITIVE SETS OF SPREADING SEQUENCES

(75) Inventors: Norbert Daniele, Movtbonnot (FR); Dominique Noguet, Grenoble (FR); Rosolino Lionti, Seyssins (FR); Jean-René Lequepeys, Fortaie (FR)

(73) Assignee: Commissariat a l'Energie Atomique, Paris (FR)

( * ) Notice: Subject to any disclaimer, the term of this patent is extended or adjusted under 35 U.S.C. 154(b) by 437 days.

(21) Appl. No.: 11/497,568

(22) Filed: Jul. 31, 2006

(65) Prior Publication Data

US 2007/0053411 A1 Mar. 8, 2007

Related U.S. Application Data

(63) Continuation of application No. 10/049,469, filed as application No. PCT/FR01/01828 on Jun. 13, 2001, now Pat. No. 7,116,698.

(30) Foreign Application Priority Data

Jun. 14, 2000 (FR) .................................. 00 07561

(51) Int. Cl.
*H04B 1/00* (2006.01)

(52) U.S. Cl. ...................... 375/130; 375/285; 375/296; 375/346; 375/367; 375/146

(58) Field of Classification Search ................. 375/130, 375/206, 140, 367, 146, 139, 142, 143, 145, 375/149, 150; 370/319, 320, 321, 330, 335, 370/342, 345, 347, 209, 515; 342/150, 151, 342/152, 153, 154, 155; 333/193, 194, 195, 333/196; 708/410
See application file for complete search history.

(56) References Cited

U.S. PATENT DOCUMENTS

| | | | | |
|---|---|---|---|---|
| 5,079,733 | A | * | 1/1992 | Antoine et al. ............... 708/252 |
| 5,500,856 | A | * | 3/1996 | Nagase et al. ............... 370/441 |
| 5,790,591 | A | | 8/1998 | Gold et al. |
| 5,815,526 | A | | 9/1998 | Rice |
| 6,160,803 | A | * | 12/2000 | Yuen et al. ................... 370/342 |
| 6,452,959 | B1 | | 9/2002 | McDonough |
| 7,116,698 | B2 | * | 10/2006 | Daniele et al. ............... 375/130 |

FOREIGN PATENT DOCUMENTS

EP 0720327 A2 12/1995

\* cited by examiner

*Primary Examiner*—Shuwang Liu
*Assistant Examiner*—Helene Tayong
(74) *Attorney, Agent, or Firm*—Connolly Bove Lodge & Hutz LLP

(57) ABSTRACT

A generator of repetitive sets of spreading sequences includes an element for counting and for forming an address and a table containing L sets of S sequences. The address contains $q+\log_2 S$ bits. The q bits are used for selecting one set among L ($L=2^q$) sets. The $\log_2 S$ bits are used for selecting one sequence among the S sequences in the set.

9 Claims, 1 Drawing Sheet

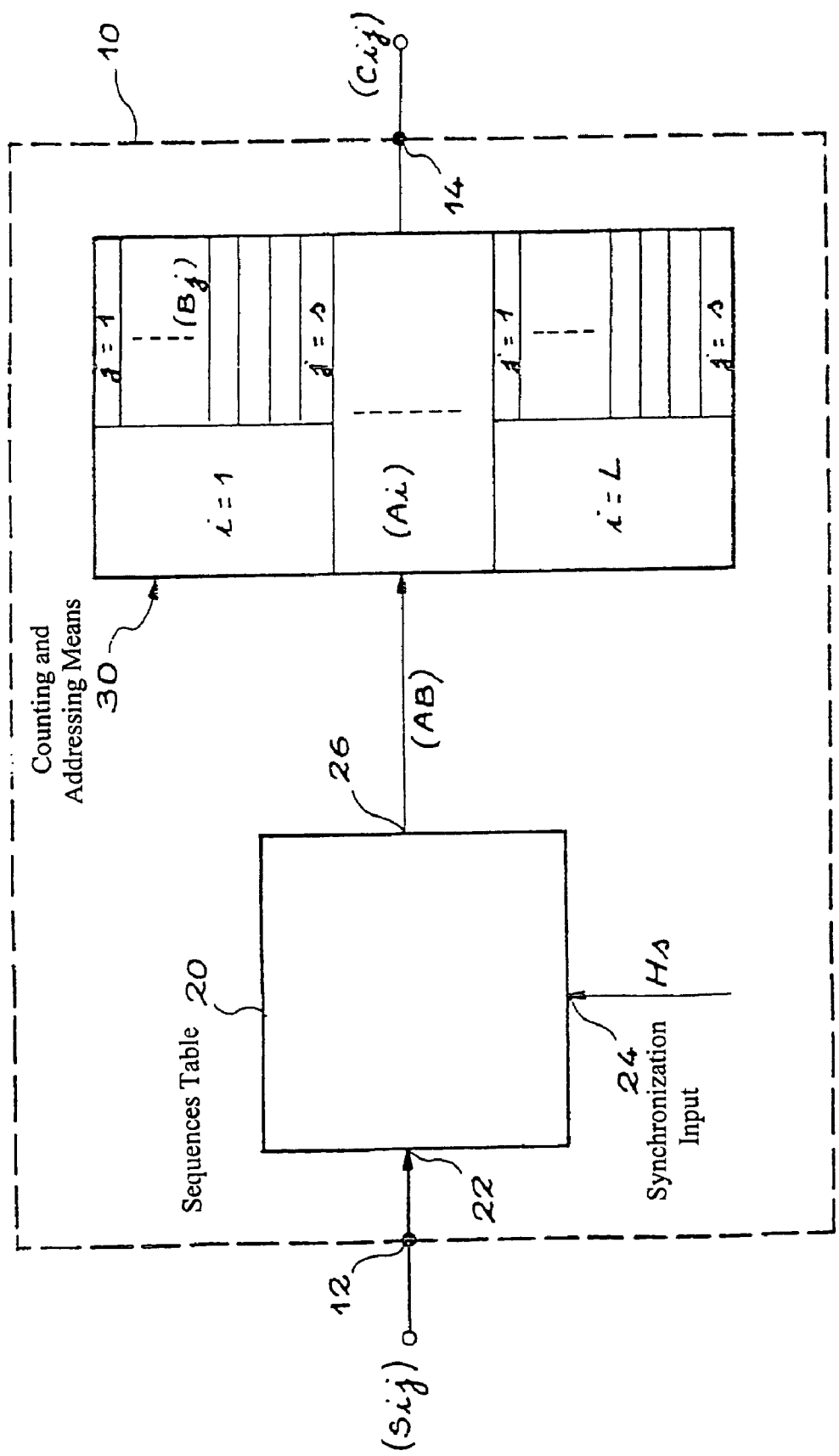

GENERATOR OF REPETITIVE SETS OF SPREADING SEQUENCES

CROSS-REFERENCE TO RELATED APPLICATION

This application is a continuation of U.S. patent application Ser. No. 10/049,469 filed on Feb. 12, 2002 now U.S. Pat. No. 7,116,698 as a 35 U.S.C. §371 National Stage application designated PCT No. PCT/FR01/01828 dated Jun. 13, 2001, all hereby incorporated herein by reference. This application claims the benefit of priority from French Application 00 07561 filed Jun. 14, 2000.

TECHNICAL DOMAIN

The purpose of this invention is a generator of repetitive sets of spreading sequences.

The invention is broadly applied for digital communications and more particularly for Wireless Local Area Networks (WLANs), Wireless subscriber Local Loops (WLL), mobile telephony, intelligent building management systems, remote charging, communication for transport, cable television, multimedia services on cable networks, etc.

STATE OF PRIOR ART

The spread spectrum technique is broadly known and has been described particularly in the following two books: Andrew J. VITERBI: "CDMA—Principles of Spread Spectrum Communication" Addison-Wesley Wireless Communications Series, 1975; John G. PROAKIS: "Digital Communications" McGraw-Hill International Editions, 3rd edition, 1995.

One particular embodiment of this technique called orthogonal keying of order M, or "M-ary Orthogonal Keying" (MOK), one signal among a set of orthogonal signals is associated with each digital symbol to be transmitted. These signals may be spreading sequences in the same family of orthogonal sequences; in this case, the modulation also does the spreading. But these signals may also be not perfectly orthogonal.

If a symbol is composed of m bits, there are $2 \cdot \sup m$ possible configurations for the different symbols. Therefore the number M of available sequences must be equal to at least $2 \cdot \sup m$. If the length of these sequences is N, it is known that not more than N orthogonal sequences can be found. Therefore, we have M=N and the number of bits per symbol is limited to $\log_2 N$.

There is a variant to the MOK technique called "M-ary Bi-orthogonal Keying" (MBOK) that consists of adding opposite values to the set of orthogonal signals used in a MOK modulation, to form a set of 2M signals, which are obviously no longer all orthogonal to each other. Demodulation uses other M correlators adapted to each of the M orthogonal sequences but also necessitates means of retrieving the sign.

In French patent application No. 99 08308, Jun. 29, 1999, the Applicant of this patent described and claimed a variant called multi-MOK or M-MOK for short. In this variant, the number of MOK modulation/demodulation operations is multiplied to deal with several data blocks. Naturally, this increases the number of sequences, but it also (very significantly) increases the information throughput.

Finally, in his application No. 99 09947, Jul. 30, 1999, this Applicant described and claimed a process using repetitive sets of spreading sequences. In this technique, designed to reduce risks of interference between symbols, successive symbols are processed with different pseudo-random sequences, so that the received signals can be better discriminated on reception. The number of different successive sequences is limited to a fixed number S. After S sequences, previously used sequences are reused. In other words, packets of S symbols are processed by repetitive sets of S sequences. The result is that the time interval after which the same pseudo-random sequence is found again is S·Ts, if Ts is the duration of a symbol. In terms of throughput, this means that for given spreading, the allowable throughput is S times higher than in prior art.

PRESENTATION OF THE INVENTION

This process, that consists of processing packets of S symbols by repetitive sets of S pseudo-random sequences, can be improved by processing L packets of S symbols in parallel, with L sets of S different sequences giving a total of LS sequences.

In the last mentioned patent application, sets of sequences are obtained by reading a table (reference 50 in the application) containing LS pseudo-random sequences denoted Cij, and this is done by addressing this table with L addresses in parallel and the L required set of sequences are retrieved on L outputs in parallel. The remaining step is to spread the symbols Sij using the corresponding sequences Cij.

The purpose of this invention is to improve this generator of sets of spreading sequences.

According to the invention, the address formed is no longer composed only of q bits of symbols to be processed (as is the case in the MOK technique in which the q bits address one of the $2^q$ sequences), but it also includes additional bits corresponding to the S sequences. $\log_2 S$ additional bits are necessary to address S different sequences, and therefore the address must include a total of $q + \log_2 S$ bits.

More precisely, the purpose of this invention is a generator of repetitive sets of spreading sequences for the transmission of symbols by spread spectrum, characterized in that it comprises: a) means of counting and forming an address comprising: an input, receiving the symbols to be processed; a synchronization input, receiving pulses synchronized with the symbols; means of counting the number of received symbols and forming an address, this address comprising a first part composed of a number q of bits where q is the number of bits in each symbol, and a second part composed of a number r of bits where $r = \log_2 S$, and where S denotes the number of sequences in a set of sequences, the address thus comprising a number p of bits where $p = q + \log_2 S$; an output on which this address can be collected, for each input of a symbol applied to the means. b) a sequences table comprising a number L of blocks (where $L = 2^q$), each block memorizing a set of S sequences, this table being addressed by the address output by the counting and addressing means, the first part of the address selecting one set among L and the second part selecting a sequence in this set.

BRIEF DESCRIPTION OF THE DRAWINGS

The single FIGURE is a diagrammatic view of the generator according to the invention.

DESCRIPTION OF A PARTICULAR EMBODIMENT

FIG. 1 shows a generator 10 according to the invention, with a main input 12 into which the numeric symbols Sij are input, and an output 14 through which the spreading sequences Cij are output. This generator 10 comprises essentially means 20 of counting and forming an address and a table 30 containing L sets of S sequences.

The means 20 comprise an input 22 receiving the symbols Sij to be processed, and a synchronization input 24 receiving the pulses Hs synchronized with the symbols.

The address formed by means 20 comprises a first part A composed of q bits, where q is the number of bits in each symbol, and a second part B composed of a number r of bits where $r=\log_2 S$, and S denotes the number of sequences in a set of codes. Thus the address AB comprises a number p of bits where $p=q+\log_2 S$. Therefore, this address has been extended and is longer than it was in prior techniques in which it only contained q bits.

The means 20 also comprise an output 26 containing the address to the table 30 that follows.

This table 30 comprises a number L of blocks Ai in which index i varies from 1 to $2^q$, each block memorizing a set of S sequences Bj where j varies from 1 to S. Therefore, the first part A of the address will select one block Ai among L, and the second part B will select one sequence Bj in this set. Finally, the address (AB) selects one sequence Cij among LS. These sequences are output through output 14.

For example, it would be possible to work starting from a single QPSK modulation (2 bits per symbol) on symbols with 4 bits per symbol (q=4) corresponding to 4 blocks Ai of 2 MOK bits, and using sets of S=4 sequences giving a total of 16 sequences which gives $r=\log_2 S=2$. The number of bits in the addresses will then be equal to 2+2=4.

In one modulation using the generator according to the invention, a set of repetitive codes is used and the sequencing of these codes is known on reception. Therefore, provided that synchronization is good, it is a priori possible to know the next code in each of the sets. Thus, the number of adapted filters necessary for the code skip part is no longer S, and is equal to 1 in the case of spread spectrum keying by direct sequence with single code skip, and $2^q$ in the case of a modulation with MOK type code skip, or $N \cdot 2^q$ in the case of a multi-code modulation with single code skip and MOK. Furthermore, it would be possible to use sliding correlators rather than adapted filters in order to simplify the embodiment. These sliding correlators can be controlled by an adapted filter that controls synchronization as described in document FR-A-2 779 590.

$S \cdot 2^q$ adapted filters are necessary to demodulate the data in reception in the case of the example of modulation with single code skip and MOK, without any reduction in complexity, while with the reduction in complexity resulting from this invention, $2^q$ sliding correlators and one adapted filter are sufficient.

The invention claimed is:

1. A generator of repetitive sets of spreading sequences comprising:

means responsive to received symbols for counting a number of symbols received and for forming an address related thereto including first and second parts, wherein the first part of the address is substantially q bits in length, q being a number of bits in each symbol, and wherein the second part of the address is substantially r bits in length, $r=\log_2 S$, and S being a number of sequences in a set of sequences, and a sequence table comprising L blocks where $L=2^q$, at least one of said L blocks being adapted to store the S sequences, the sequence table being responsive to said address for selecting a desired sequence wherein the first part of the address is utilized for selecting a particular block from among the L blocks and the second part of the address is utilized for selecting the desired sequence from among the S sequences stored in the selected particular block.

2. The generator as defined in claim 1 wherein at least one set of the S sequences comprises a pseudorandom sequence.

3. A method for generating repetitive sets of spreading sequences comprising:

counting a number of symbols received and forming an address related thereto including first and second parts, wherein the first part of the address is substantially q bits in length, q being a number of bits in each symbol, and wherein the second part of the address is substantially r bits in length, $r=\log_2 S$, and S being a number of sequences in a set of sequences, and in response to said address, selecting a desired sequence from a sequence table comprising L blocks where $L=2^q$, at least one of said L blocks being adapted to store the S sequences, by:

selecting a particular block from among the L blocks by applying the first part of the address, and selecting the desired sequence from among the S sequences stored in the particular block by applying the second part of the address.

4. The method as defined in claim 3 and further comprising receiving symbols.

5. The method as defined in claim 4 wherein at least one set of the S sequences comprises a pseudorandom sequence.

6. The method as defined in claim 3 and further comprising spreading at least one received symbol with the desired sequence.

7. The method as defined in claim 6 wherein at least one set of the S sequences comprises a pseudorandom sequence.

8. The method as defined in claim 3 and further comprising repeating usage of the sequences in a block after each of the S sequences in that block have been selected.

9. The method as defined in claim 8 wherein at least one set of the S sequences comprises a pseudorandom sequence.

* * * * *